United States Patent Office 3,770,661
Patented Nov. 6, 1973

3,770,661
ARYLENEISOPROPYLIDENE COPOLYMERS
André Fritz, Wilmington, Del., assignor to E. I. du Pont
de Nemours and Company, Wilmington, Del.
No Drawing. Continuation of application Ser. No.
93,426, Nov. 27, 1970. This application May 22,
1972, Ser. No. 255,902
Int. Cl. C08g 25/00
U.S. Cl. 260—2 R                          20 Claims

ABSTRACT OF THE DISCLOSURE

Aryleneisopropylidene copolymers are provided such as those derived, for example, from p-bis(2-chloroisopropyl) benzene and diphenylether, having an inherent viscosity sufficiently high to form a solid copolymer which may be fabricated into shaped structures. A process and a catalyst system for preparing said copolymers are also provided; said process including reacting monomers such as p-bis(2-chloroisopropyl)benzene and diphenylether at a temperature of −40° C. in the presence of a catalyst comprising triphenylmethylhexafluoroarsenate, AlCl₃ and nitrobenzene.

---

This application is a continuation of U.S. patent application Ser. No. 93,426, filed Nov. 27, 1970, and now abandoned.

The present invention relates to novel polymers. More particularly, the present invention is directed to novel aryleneisopropylidene copolymers and a novel process and catalyst system for their preparation.

According to the present invention there is provided a novel aryleneisopropylidene copolymer having the following recurring structural unit:

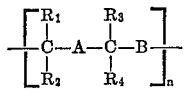

wherein A and B are the same or different and each is a divalent aromatic radical; $R_1$, $R_2$, $R_3$ and $R_4$ are the same or different and are alkyl; and $n$ is a number sufficient to provide a copolymer having an inherent viscosity high enough to form a solid copolymer. The copolymers of the invention have an inherent viscosity of at least about 0.25, and preferably between about 0.3 and about 1.7, measured as a solution of the copolymer in o-dichlorobenzene at 30° C.

The copolymers of the present invention may be molded into any desired shape by conventional molding techniques, and they are especially adapted to be injection molded to provide a wide variety of desired shape structures, e.g., lenses for light fixtures, combs, gears, etc.

According to the present invention there also is provided a process for preparing the above-described copolymer which comprises reacting a bis(2-chloroisopropyl) aromatic monomer having the following structural formula:

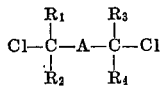

wherein A, $R_1$, $R_2$, $R_3$ and $R_4$ are as above defined, with an aromatic comonomer.

The nature and advantages of the copolymer of the present invention will be more clearly understood from the following description thereof.

The copolymer of the present invention is obtained by reacting a bis(2-chloroisopropyl) aromatic monomer with an aromatic comonomer.

Suitable bis(2-chloroisopropyl) aromatic monomers of the above formula include:

1,4-bis(2-chloroisopropyl)benzene;
1,3-bis(2-chloroisopropyl)benzene;
and aromatic diisopropyldichloro compounds of the formula:

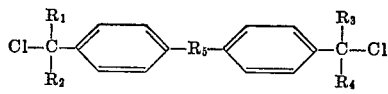

wherein $R_1$, $R_2$, $R_3$ and $R_4$ are as above defined and $R_5$ is alkylidene of 1–4 carbon atoms, or oxyalkylidene of 1–4 carbon atoms; for example, $R_5$ may be propylidene,

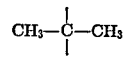

or dioxyethylene, —O—CH₂—CH₂—O—.

Suitable aromatic comonomers from which B is derived include, for example:

benzene;
naphthalene;
heterocyclic aromatic compounds;
and aromatic compounds of the formula

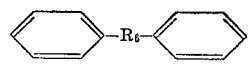

wherein $R_6$ is alkylidene of 1–4 carbon atoms, oxyalkylene of 1–4 carbon atoms, —O—, —S—, and —NH—.

The polymerization reaction is conducted in the presence of a catalyst system comprising a Lewis acid selected from the group of AlCl₃, AlBr₃, Al₂Et₃Cl₃, BF₃, AlEtCl₂ and TiCl₄/AlEtCl₂, and a nitro agent such as, for example, nitrobenzene or nitroalkanes such as nitromethane. The catalyst preferably additionally contains a chlorinated metal of Group IV–B of the Periodic Table as published by Fisher Scientific Co. (U.S. Copyright 1957) such as TiCl₄ or a trityl compound of the formula TM$_p$X$_n$ wherein T is trityl, M is arsenic, antimony, phosphorus, or boron; X is halogen such as F, Cl or mixed halogen such as F₄.₅Cl₁.₅ or F₅Cl, $p$ is 0 or 1, and $n$ is 1 to 6, provided that $n$ is 1 when $p$ is 0 and $n$ is 4 or 6 when $p$ is 1. Suitable trityl-containing compounds include triphenylmethylchloride, triphenylmethylhexafluoroarsenate, triphenylmethylhexafluoroantimonate, triphenylmethylmonochloropentafluoroantimonate. An especially suitable catalyst consists of tritylhexafluoroarsenate and aluminum trichloride in nitrobenzene. The catalyst contains between about 0.5 and about 30 mole percent, based on the amount of bis(2-chloroisopropyl) aromatic monomer initially present, of the Lewis acid and between about 10 and about 200 mole percent, based upon the amount of bis(2-chloroisopropyl) aromatic monomer initially present, of the nitro agent. Preferably, between about 2.5 and about 15 mole percent of the Lewis acid and between about 25 and about 100 mole percent of the nitro agent are used. If used, the trityl compound or the chlorinated compound is present in an amount up to about 20 mole percent, preferably 5 mole percent, based on the amount of bis(2-chloroisopropyl) aromatic monomer initially present.

The polymerization reaction of the invention is conducted in a suitable solvent system. The solvents useful in the solution polymerization include any suitable organic solvents in which the copolymer is soluble. Suitable solvents include chlorinated alkanes such as monochloromethane (methyl chloride), methylenechloride, ethylenechloride and chlorinated aromatic compounds such as monochlorobenzene and dichlorobenzene. Thus, the solvent is characterized as being inert to the polymerization system and is a solvent for the product, and preferably is also a solvent for at least one of the monomeric reactants.

The polymerization reaction of the invention may proceed within a broad temperature range. For example, the polymerization reaction may be conducted from as low as −130° C. to as high as about 25° C. Temperatures of below about −20° C., e.g. −70° C., are preferred in order to favor polymer chain growth and preclude or at least suppress side reactions involving the bis(2-chloroisoproyl) aromatic monomer. The polymerization temperature may be permitted to increase during the course of the reaction by either the exothermic heat of the reaction or by applying external heat. The specific polymerization temperature employed initially and the course of the reaction temperature will depend to some extent upon the selection of process conditions as, for example, the particular monomers that are reacted, the amount of monomers reacted, the amount of catalyst employed, whether the process is batch or continuous, as will readily be understood by anyone skilled in the art.

The polymerization reaction may be carried out at any convenient pressure. Preferably, the process is carried out at atmospheric pressure.

The isopropylidene copolymers of the invention may be end-capped with suitable end groups such as those of the formula:

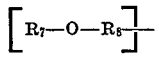

wherein $R_7$ and $R_8$ are the same or different and are phenyl, biphenyl, naphthalene, polyphenylether, phenoxyethane. End-capping is preferably accomplished with a phenyl ether end group to provide a copolymer structure of:

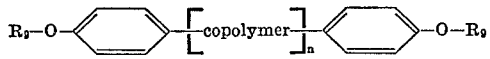

wherein $R_9$ is $R_7$, and the most preferred end capping is with a diphenyl ether end group to provide a copolymer structure of:

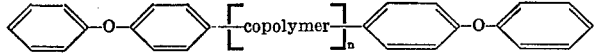

End-capping also may be accomplished by means of a suitable end-capping agent such as cumyl chloride, phenoxyl cumyl chloride or α-methylstyrene which may conveniently be added to the polymerization reaction and which forms indane end groups with the growing polymeric chain during the course of the polymerization reaction.

The degree of polymerization of the aryleneisopropylidene copolymers of the invention is subject to deliberate control. The use of equimolar amounts of the aromatic isopropylidichloro monomer and the aromatic comonomer provides copolymers of high molecular weight. The use of either monomeric reactant in large excess limits the molecular weight of the copolymer.

The molecular weight of the copolymer of the invention is sufficiently high that it may be molded into shaped objects. Specifically, the inherent viscosity of the copolymer is at least about 0.25, and preferably at least about 0.3, measured as a solution of the copolymer in o-dichlorobenzene at 30° C. Inherent viscosity data is obtained by measuring the viscosity of the copolymer solution relative to that of the solvent alone, and inherent viscosity is calculated from the following equation:

$$\text{Inherent viscosity} = \frac{\text{Natural logarithm}\left(\frac{\text{Viscosity of copolymer solution}}{\text{Viscosity of solvent}}\right)}{C}$$

where C is the concentration expressed in grams of copolymer per 100 milliliters of solution. The copolymer solution is obtained by dissolving 0.5 grams of the copolymer in an initial amount of solvent less than 100 mls. at 30° C., and then adjusting the total solution to 100 mls. by adding additional solvent at 30° C. As is known in the polymer art, inherent viscosity is directly related to the molecular weight of the polymer.

The copolymers of the invention that are produced by the above-described polymerization reaction may be isolated, recovered and, if desired, purified in accordance with conventional techniques. For example, the copolymer may be washed with methanol, filtered and dried under vacuum.

The polymerization reaction above described is exemplified herebelow, and in typical practice includes placing the monomeric components such as phenyl ether and p-bis(2-chloroisoproyl)benzene into a suitable reaction vessel along with the solvent, e.g., methylene chloride, and part of the catalyst system, for example, the tritylcontaining compound. The reaction vessel is then cooled to, for example, about −40° C. and next the remainder of the catalyst system, for example, the Lewis acid, is added to initiate the polymerization reaction which is allowed to proceed to completion. Additional solvent such as ethylene chloride may be added to the vessel during the course of the polymerization reaction. After completion of the polymerization reaction, an end-capping agent such as phenyl ether may be added to the vessel to cap the ends of the polymer. The polymer solution may then be poured into acetone to precipitate the polymer which may then be washed with methanol and dried in a vacuum oven at, for example, 100° C.

The p-bis(2-chloroisopropyl)benzene above mentioned is prepared as follows:

Twenty-five grams of p-diisopropenylbenzene and 200 cc. methylene chloride (distilled over $P_2O_5$) are placed in a 500 cc. three-neck, round-bottom flask equipped with stirrer, gas-inlet tube, and drying tube, and cooled to −30° C. Anhydrous HCl is passed through the reaction mixture until the HCl adsorption ceases. After 2½ hours, the reaction is complete and allowed to reach room temperature under a nitrogen stream. This solution is then filtered through alumina and the methylenechloride removed with a rotary-evaporator at room temperature. Pure p-bis(2-chloroisopropyl benzene) having a melting point of 72° C. is obtained at 90% yield.

The m - bis(2 - chloroisopropyl)benzene was prepared from m-diisopropenylbenzene in the same manner as described immediately above. It crystallizes as white needles at 0° C. and yields of 90–100% are obtained. NMR and IR data confirms the monomer preparation; e.g., IR confirms the presence of gem-dimethyl group at 7.24 and 7.32 microns and proton NMR shows a peak at a p.p.m. (τ) of 8.1.

The principal and practice of the invention will now be illustrated by the following examples which are only exemplary thereof and it is not intended that the invention be limited thereto since modifications in technique and operation will be apparent to anyone skilled in the art. All parts and percentages expressed in the following examples are by weight unless otherwise indicated.

The copolymers of the present invention prepared in the following examples were evaluated in accordance with the following procedures:

Tensile strength: ASTM–D 1708
Tensile modulus: ASTM–D 1708
Flex modulus: ASTM–D 790
Elongation: ASTM–D 1708
Tensile impact: ASTM–D 1822
Notched izod: ASTM–D 256
$T_g$: By differential thermal analysis heating at 20° C./min. using a Du Pont Model 900 DTA Analyzer.
TGA ($N_2$) and (AIR): By thermal gravimetric analysis heating at 10° C./min. using a Du Pont Model 950 TGA Analyzer.

EXAMPLE 1

16.8 ml. nitrobenzene (distilled), 51.0 ml. distilled phenyl ether, 76.5 g. p-bis(2-chloroisopropyl)benzene (recrystallized from n-hexane), 350 mg. triphenylmethylhexafluoroarsenate and 400 ml. methylenechloride was added to a 1-liter three-neck flask equipped with a mechanical stirrer, a thermometer, a gas inlet and a drying tube. The reaction mixture was then cooled to −42° C. Thereafter, 3.750 g. sublimed anhydrous aluminum chloride was added to the reaction mixture. Instantly, a brown-red complex formed and after an induction period of about 2 minutes, HCl began to evolve. During the 2½ hour reaction time, 300 ml. $CH_2Cl_2$ was added slowly to dilute the reaction. At the end of the polymerization, 5 mls. of phenyl ether was added to cap the end groups. After a total of 2 hours and 35 minutes reaction time, 5 ml. MeOH and 100 ml. $CH_2Cl_2$ were added in order to stop the reaction. The polymer solution was then diluted with 300 ml. $CH_2Cl_2$, poured into 5 liters acetone, stirred mechanically in a high shear blender and filtered. The polymer was washed 2 times with MeOH and dried for 24 hours in a vacuum oven at 100° C. The yield of the polymer was 97% and gave an inherent viscosity of 1.3 in o-dichlorobenzene at 30° C. NMR analyses of the copolymer showed resonances at a p.p.m. (τ) of about 2.9 and about 8.3.

Self-supporting film and bar structures of the copolymer were prepared by compression molding and the physical properties of the copolymer structure are indicated in Table I below:

TABLE I

Physical properties

Appearance: Clear, transparent and tough
Tensile strength: 11,500 p.s.i.
Tensile modulus: 360,000 p.s.i.
Flex modulus: 498,000 p.s.i.
Elongation: 20–30%
Tensile impact: 145 ft. lb./in.²
Notched Izod (23° C.): 1.4
Torsion pendulum: No major loss peaks between 180° and 130°
$T_g$: 152° C.
First weight loss by
    TGA ($N_2$): 500° C.
    (AIR): 450° C.

EXAMPLE 2

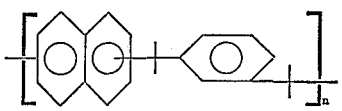

50 ml. of methylenechloride, 0.5 ml. of nitrobenzene, 2.56 g. (0.02 mole) of naphthalene, 200 mg. of triphenylmethylhexafluoroarsenate and 200 mg. of $AlCl_3$ were added to a reaction flask having a side arm and a drying tube. The mixture was allowed to react at room temperature for 10 minutes while being stirred mildly. The reaction mixture was next cooled to −20° C. and equilibrated for 5 minutes.

4.2 ml. (0.02 mole) of m-bis(2-chloroisopropyl)benzene was added to the reaction flask. HCl started to evolve. Helium was swept over the reaction mixture at a rate of 500 cc./min. to remove the HCl. After 5 minutes, 100 mg. of $AlCl_3$ was added to the reaction flask and the mixture was allowed to react for 1½ hours at about −20° C. The thick copolymer solution was slowly diluted with 150 mls. of methylenechloride. A portion of the polymer solution was poured into 500 cc. of methanol at room temperature, stirred mechanically, filtered and washed 3 times with 150 cc. of methanol and dried overnight in a vacuum oven at 50° C. The inherent viscosity of the copolymer was 0.81, measured as a solution of the copolymer in o-dichlorobenzene at 30° C.

The remaining portion of the copolymer solution was allowed to react an additional 5 hours at about −20° C. The thick copolymer solution was slowly diluted with 150 mls. of methylenechloride and the mixture was poured into 500 cc. of methanol at room temperature, stirred mechanically, filtered and washed 3 times with 150 mls. of methanol and dried overnight in a vacuum oven at 50° C. The inherent viscosity of the copolymer was 0.95, measured as a solution of the copolymer in o-dichlorobenzene at 30° C. IR and NMR spectral analysis of the copolymer showed no indane formation; NMR analyses showed resonances at a PPM (τ) of about 3.0 and about 8.3.

EXAMPLE 3

1.0 ml. of distilled nitrobenzene, 3.1 ml. of freshly distilled diphenyl ether, 4.65 g. of p-bis(2-chloroisopropyl)benzene and 30 mls. of freshly distilled methylene chloride were added to a reaction flask equipped with a mechanical stirrer, a gas inlet and a drying tube. The reaction flask was then cooled to −45° C. after which 50 mg. of triphenylmethylhexafluoroarsenate and 250 mgs. of $AlCl_3$ were added thereinto.

The reaction flask was maintained at about −45° C. for 1½ hours after which 50 mls. of dry methylene chloride was slowly added thereinto. After a total elapsed reaction time of 4¾ hours, 0.25 ml. of diphenylether in 6 mls. of methylene chloride was added to the reaction flask to endcap the copolymer. The copolymer solution was next poured into 500 cc. of methanol, stirred mechanically, filtered and washed three times with 300 cc. of methanol and dried for 24 hours in a vacuum oven at 70° C. The yield of copolymer was 98%. The inherent viscosity of the copolymer was 1.4, measured as a solution of the copolymer in o-dichlorobenzene at 30° C. NMR analysis of the copolymer showed resonances at p.p.m. (τ) of about 8.4 and about 2.8.

Samples of the copolymer were compression molded at 300° C. and 30,000 p.s.i. pressure to provide tough, clear film structures having a tensile strength of 10,000 p.s.i., a modulus of 300,00 p.s.i. and an elongation of 7.1%. Film samples of 5 mils. thickness were folded between 35 and 50 times before breaking. The $T_g$ of the copolymer was between 150° C. and 170° C.

EXAMPLE 4

The procedure described in Example 3 was repeated using 4.28 g. of 1,2-diphenoxyethane and 4.65 g. of p-bis(2-chloroisopropyl)benzene. A copolymer was obtained having an intrinsic viscosity of 0.48, as measured in o-dichlorobenzene at 30° C. The copolymer could be compression molded into tough clear film structures.

EXAMPLE 5

The procedure described in Example 2 was repeated by reacting 3.0 mls. of diphenylether with 4.2 mls. of m-bis(2-chloroisopropyl)benzene in 20 mls. of methylene chloride utilizing a catalyst system of 1.0 ml. nitrobenzene, 200 mg. triphenylmethylhexafluoroarsenate, 250 mg. of $AlCl_3$. The reaction mixture was diluted with o-chlorobenzene. A copolymer of inherent viscosity of 0.9 and 1.0 was obtained after 2½ and 5 hours reaction time, respectively, wherein the inherent viscosity was measured in o-dichlorobenzene at 30° C.

EXAMPLE 6

The procedure of Example 2 was repeated by reacting for 5 hours at 0° C. 1.0 ml. of thiophene with 2.5 g. of m-bis(2-chloroisopropyl)benzene utilizing a catalyst of 150 mg. of triphenylmethylhexafluorophosphate, 0.1 ml. of boron trifluoride etherate and 10 mls. of nitrobenzene. The copolymer had an inherent viscosity of 0.35, as measured in o-dichlorobenzene at 30° C.

EXAMPLES 7–9

The procedure of Example 1 was repeated using the monomers listed in Table II below, and copolymers having the inherent viscosity and $T_g$ indicated also in Table II were obtained.

TABLE II

| Example | Monomer | Monomer | $T_g$ | Inherent Viscosity |
|---------|---------|---------|-------|--------------------|
| 7 | Naphthalene | p-Bis(2-chloroisopropyl)benzene | 220 | 0.3 |
| 8 | Diphenylamine | m-Bis(2-chloroisopropyl)benzene | 170 | 0.25 |
| 9 | Benzene | do | 120 | 0.3 |

EXAMPLE 10

Fifty ml. of methylenechloride, 4.0 ml. of nitrobenzene (0.0386 mole), 10.8 g. of p-bis(2-chloroisopropyl)benzene (0.0462 mole), 6.3 ml. of phenylether (0.0396 mole), 1.5 ml. of 1-molar $TiCl_4$ solution in methylenechloride (1.5 mmoles) and 1.5 ml. of 1-molar $AlEtCl_2$-solution in methylenechloride (1.5 mmoles) were added at —40° C. to a reaction flask having a side arm, a drying tube, and magnetic stirrer. HCl started to evolve instantly. Nitrogen was swept over the reaction mixture at a rate of about 500 cc./min. to remove the HCl during five hours. The reaction mixture was diluted with 150 cc. of methylenechloride during the course of the reaction. At the end of the polymerization, the reaction mixture was diluted with an additional 150 cc. of methylenechloride, and the polymer was precipitated by pouring the reaction mixture into 500 cc. of methanol at room temperature. After washing and drying of the copolymer as in Example 2, a quantitative yield of the copolymer was obtained having an inherent viscosity of 1.3 in o-dichlorobenzene at 30° C. NMR spectral analysis of the copolymer showed the presence of only protons on aromatic and isopropyl structures.

EXAMPLE 11

The procedure described in Example 10 was repeated using 50 ml. of methylenechloride, 4.0 ml. of nitrobenzene (0.0386 mole), 11.2 g. of p-bis(2-chloroisopropyl)benzene of (0.0481 mole), 6.3 ml. of phenylether (0.0396 mole), and 3.0 ml. of 1-molar $AlEtCl_2$-solution in methylenechloride (3.0 mmoles). A copolymer was obtained having an inherent viscosity of 0.62 (measured in o-dichlorobenzene at 30° C.).

EXAMPLE 12

The procedure described in Example 10 was repeated using 50 ml. of methylenechloride, 2.0 ml. of nitrobenzene, 9.5 g. of p-bis(2-chloroisopropyl)benzene, 6.2 ml. of phenylether, 50 mg. of triphenylhexafluoroarsenate and 500 mg. of $AlCl_3$. After five hours, the reaction was complete and yielded a copolymer with an inherent viscosity of 0.8 (measured in o-dichlorobenzene at 30° C.).

EXAMPLE 13

Example 12 was repeated without the addition of nitrobenzene. The polymer collected from the reaction mixture had an inherent viscosity of only 0.15. The nitro agent is therefore necessary for obtaining copolymers of desirable molecular weight.

EXAMPLE 14

Example 10 was repeated using the following ingredients: 4.75 g. of p-bis(2-chloroisopropyl)benzene, 3.0 ml. of phenylether, 25 ml. of methylenechloride, 1.0 ml. of 1-molar $Al_2Et_3Cl_3$/methylenechloride solution (1.0 mmole), and 1.0 ml. of nitrobenzene. The copolymer obtained had an inherent viscosity of 0.45 (measured in o-dichlorobenzene at 30° C.).

EXAMPLE 15

Example 10 was repeated using the following ingredients: 9.5 g. of p-bis(2-chloroisopropyl)benzene, 6.0 ml. of pheylether, 75 mg. of triphenylmethylhexafluoroarsenate, 2.1 ml. of nitrobenzene, and 1.0 g. of $AlBr_3$. The reaction was complete after three hours and the recovered copolymer had an inherent viscosity of 0.45 (measured in o-dichlorobenzene at 30° C.).

EXAMPLE 16

The polymerization procedure described in Example 10 was repeated using 1.28 g. of naphthalene, 2.5 ml. of m-bis(2-chloroisopropyl)benzene, 1.0 ml. of nitrobenzene, 200 mg. of $AgSbF_6$, 100 mg. of triphenylmethylhexafluorophosphate and 20 ml. of methylenechloride. The reaction was conducted for six hours at —15° C. A copolymer was obtained having an inherent viscosity of 0.25 (measured in o-dichlorobenzene at 30° C.).

EXAMPLE 17

Following the polymerization procedure described in Example 10, 1.28 g. of naphthalene, 2.5 ml. of m-bis(2-chloroisopropyl)benzene, 10 ml. of nitrobenzene, 100 mg. triphenylmethylhexafluorophosphate, and 70 mg. of $AlCl_3$ were reacted for two hours at room temperature. The copolymer which was recovered had an inherent viscosity of 0.7 (measured in o-dichlorobenzene at 30° C.).

EXAMPLE 18

Following the polymerization procedure described in Example 10, 1.28 g. of naphthalene, 2.1 ml. of m-bis(2-chloroisopropyl)benzene, 10 ml. of nitrobenzene, and 150 mg. of triphenylmethylhexafluoroantimonate was reacted at 0° C. for two hours. The recovered copolymer had an inherent viscosity of 0.36 (measured in o-dichlorobenzene at 30° C.).

EXAMPLE 19

As in Example 10, the following ingredients were reacted: 10 mmoles of m-bis(2-chloroisopropyl)benzene, 10 mmoles of naphthalene, 1.1 mmoles of $AlCl_3$, 0.25 mmole triphenylmethylchloride, 5 mmoles nitrobenzene, and 20 ml. of methylenechloride at —40° C. for 5.5 hours. A copolymer having an inherent viscosity of 0.95 (measured in o-dichlorobenzene at 30° C.) was obtained in a yield of 86%.

What is claimed is:

1. A copolymer having the following recurring structural unit:

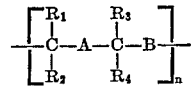

wherein A and B are different; A is selected from the group consisting of

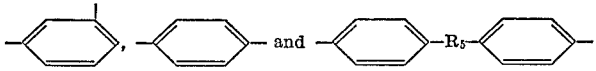

wherein $R_5$ is alkylidene of 1–4 carbon atoms or oxyalkylene of 1–4 carbon atoms; B is derived from the group consisting of benzene, naphthalene, thiophene, and aromatic compounds of the formula

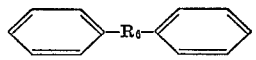

wherein $R_6$ is selected from the group consisting of alkylidene of 1–4 carbon atoms, oxyalkylene of 1–4 carbon atoms, —O—, —S— and —NH—; $R_1$, $R_2$, $R_3$ and $R_4$ are methyl; and $n$ is a number sufficient to provide a copolymer having an inherent viscosity high enough to form a solid copolymer.

2. A copolymer of claim 1 having an inherent viscosity of at least about 0.25 measured as a solution of the copolymer in o-dichlorobenzene at 30° C.

3. The copolymer of claim 2 wherein A is

4. The copolymer of claim 2 wherein A is

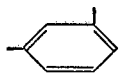

5. The copolymer of claim 2 wherein B is derived from an aromatic compound which is diphenyl ether.

6. The copolymer of claim 5 wherein A is

7. The copolymer of claim 5 wherein A is

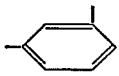

8. The copolymer of claim 2 wherein B is derived from benzene.

9. The copolymer of claim 2 wherein B is derived from naphthalene.

10. The copolymer of claim 9 wherein A is

11. The copolymer of claim 9 wherein A is

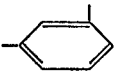

12. A process for preparing aryleneisopropylidene copolymers having the following recurring structural unit:

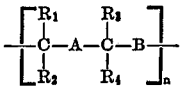

wherein A and B are different, A is selected from the group consisting of

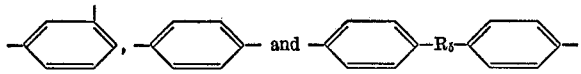

wherein $R_5$ is alkylidene of 1–4 carbon atoms or oxyalkylene of 1–4 carbon atoms; B is derived from the group consisting of benzene, naphthalene, thiophene, and aromatic compounds of the formula:

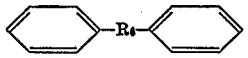

wherein $R_6$ is selected from the group consisting of alkylidene of 1–4 carbon atoms, oxyalkylene of 1–4 carbon atoms, —O—, —S— and —NH—; $R_1$, $R_2$, $R_3$ and $R_4$ are methyl; and $n$ is a number sufficient to provide a copolymer having an inherent viscosity high enough to form a solid copolymer which comprises reacting an aromatic isopropyl dichloro monomer of the formula

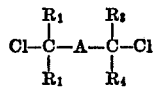

wherein A is a divalent aromatic radical selected from the group consisting of

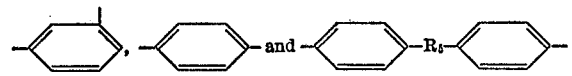

wherein $R_5$ is alkylidene of 1–4 carbon atoms or oxyalkylene of 1–4 carbon atoms; $R_1$, $R_2$, $R_3$ and $R_4$ are methyl; with an aromatic comonomer selected from the group consisting of benzene, naphthalene, thiophene, and aromatic compounds of the formula

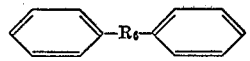

wherein $R_6$ is selected from the group consisting of —O—, —S—, —NH—, alkylidene of 1–4 carbon atoms, and oxyalkylene of 1–4 carbon atoms in an organic solvent in which said copolymer is soluble, at a temperature between about —130° C. and about 25° C. in the presence of a catalyst comprising between about 0.5 and about 30 mole percent, based on the amount of aromatic isopropyl dichloro monomer initially present, of a Lewis acid selected from the group consisting of $AlCl_3$, $BF_3$, $AlBr_3$, $Al_2Et_3Cl_3$, $AlEtCl_2$ and $TiCl_4/AlEtCl_2$, and between about 10 and about 200 mole percent, based upon the amount of aromatic isopropyl dichloro monomer initially present of a nitro agent selected from the group consisting of nitrobenzene and nitroalkanes.

13. The process of claim 12 wherein said reaction is conducted at a temperature between about —70° C. and about —20° C.

14. The process of claim 12 wherein said catalyst additionally contains up to 20 mole percent of $TiCl_4$ or a compound of the formula $TM_pX_n$ wherein T is trityl or silver, M is arsenic, antimony, phosphorus or boron, X is halogen or mixed halogen, $p$ is 0 or 1 and $n$ is 1 to 6, provided that $n$ is 1 when $p$ is 0 and $n$ is 4 or 6 when $p$ is 1.

15. The process of claim 14 wherein said Lewis acid is $AlCl_3$, said nitro agent is nitrobenzene, and said trityl compound is triphenylmethylhexafluoroarsenate.

16. The process of claim 14 wherein A is

17. The process of claim 14 wherein A is

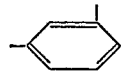

18. The process of claim 14 wherein said aromatic comonomer is diphenyl ether.

19. The process of claim 18 wherein A is

20. The process of claim 18 wherein A is

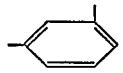

References Cited

UNITED STATES PATENTS

| | | | |
|---|---|---|---|
| 2,870,098 | 1/1959 | Martin et al. | 260—2 H |
| 3,002,913 | 10/1961 | Pino | 260—2 H |
| 3,066,101 | 11/1962 | Wilgus | 260—2 H |
| 3,291,777 | 12/1966 | Stamatoff et al. | 260—2 H |
| 3,346,514 | 10/1967 | Isaacson et al. | 260—2 H |
| 3,437,644 | 4/1969 | Neuse et al. | 260—2 H |

WILBERT J. BRIGGS, SR., Primary Examiner

U.S. Cl. X.R.

260—2 H, 47 R, 79

PO-1050
(5/69)

UNITED STATES PATENT OFFICE
CERTIFICATE OF CORRECTION

Patent No. 3,770,661      Dated November 6, 1973

Inventor(s) Andre Fritz

It is certified that error appears in the above-identified patent and that said Letters Patent are hereby corrected as shown below:

In Column 9, line 57, Claim 12 "$R_1$" should read -- $R_2$ --.

Signed and sealed this 30th day of July 1974.

(SEAL)
Attest:

McCOY M. GIBSON, JR.
Attesting Officer

C. MARSHALL DANN
Commissioner of Patents